US012150022B2

(12) United States Patent
Sugie et al.

(10) Patent No.: US 12,150,022 B2
(45) Date of Patent: Nov. 19, 2024

(54) METHOD, INFORMATION PROCESSING DEVICE, AND NON-TRANSITORY STORAGE MEDIUM

(71) Applicant: TOYOTA JIDOSHA KABUSHIKI KAISHA, Toyota (JP)

(72) Inventors: Yui Sugie, Nagoya (JP); Koichi Suzuki, Miyoshi (JP); Naoki Uenoyama, Nagoya (JP); Hiroki Takeda, Okazaki (JP); Hirohiko Morikawa, Toyota (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 17/548,631

(22) Filed: Dec. 13, 2021

(65) Prior Publication Data
US 2022/0201446 A1  Jun. 23, 2022

(30) Foreign Application Priority Data

Dec. 18, 2020  (JP) ................. 2020-210717

(51) Int. Cl.
H04W 4/44 (2018.01)
H04W 4/029 (2018.01)
H04W 4/12 (2009.01)

(52) U.S. Cl.
CPC ............ *H04W 4/44* (2018.02); *H04W 4/029* (2018.02); *H04W 4/12* (2013.01)

(58) Field of Classification Search
CPC ......... H04W 4/12; H04W 4/029; H04W 4/44; H04W 4/90; G06Q 50/40; G06Q 50/265
See application file for complete search history.

(56) References Cited

U.S. PATENT DOCUMENTS

| | | | |
|---|---|---|---|
| 9,513,134 B1* | 12/2016 | Ishikawa | H04W 4/021 |
| 11,242,051 B1* | 2/2022 | Konrardy | G08G 1/096725 |
| 11,410,509 B1* | 8/2022 | Lecocke | G08B 7/06 |
| 2007/0072583 A1* | 3/2007 | Barbeau | H04M 3/487 455/404.2 |
| 2016/0131358 A1* | 5/2016 | Spiro | H01F 41/041 455/561 |
| 2018/0181091 A1* | 6/2018 | Funk | G08G 1/133 |
| 2019/0066464 A1* | 2/2019 | Wedig | G08B 27/001 |
| 2019/0342739 A1* | 11/2019 | Shah | H04W 4/46 |
| 2020/0273335 A1* | 8/2020 | Murakami | G08G 1/205 |
| 2022/0147064 A1* | 5/2022 | Borgyos | G05D 1/606 |

FOREIGN PATENT DOCUMENTS

| | | | |
|---|---|---|---|
| JP | 2015-018516 A | | 1/2015 |
| JP | 2019-045370 A | | 3/2019 |

* cited by examiner

*Primary Examiner* — Congvan Tran
(74) *Attorney, Agent, or Firm* — Oliff PLC

(57) ABSTRACT

A method that is performed by an information processing device that communicates with a plurality of vehicles includes identifying any vehicle located in a disaster area out of the plurality of vehicles, sending a first message asking a user of the identified vehicle whether the vehicle is being used as an evacuation spot for spending the night, and determining whether the vehicle is being used as the evacuation spot, based on a first response to the first message.

9 Claims, 3 Drawing Sheets

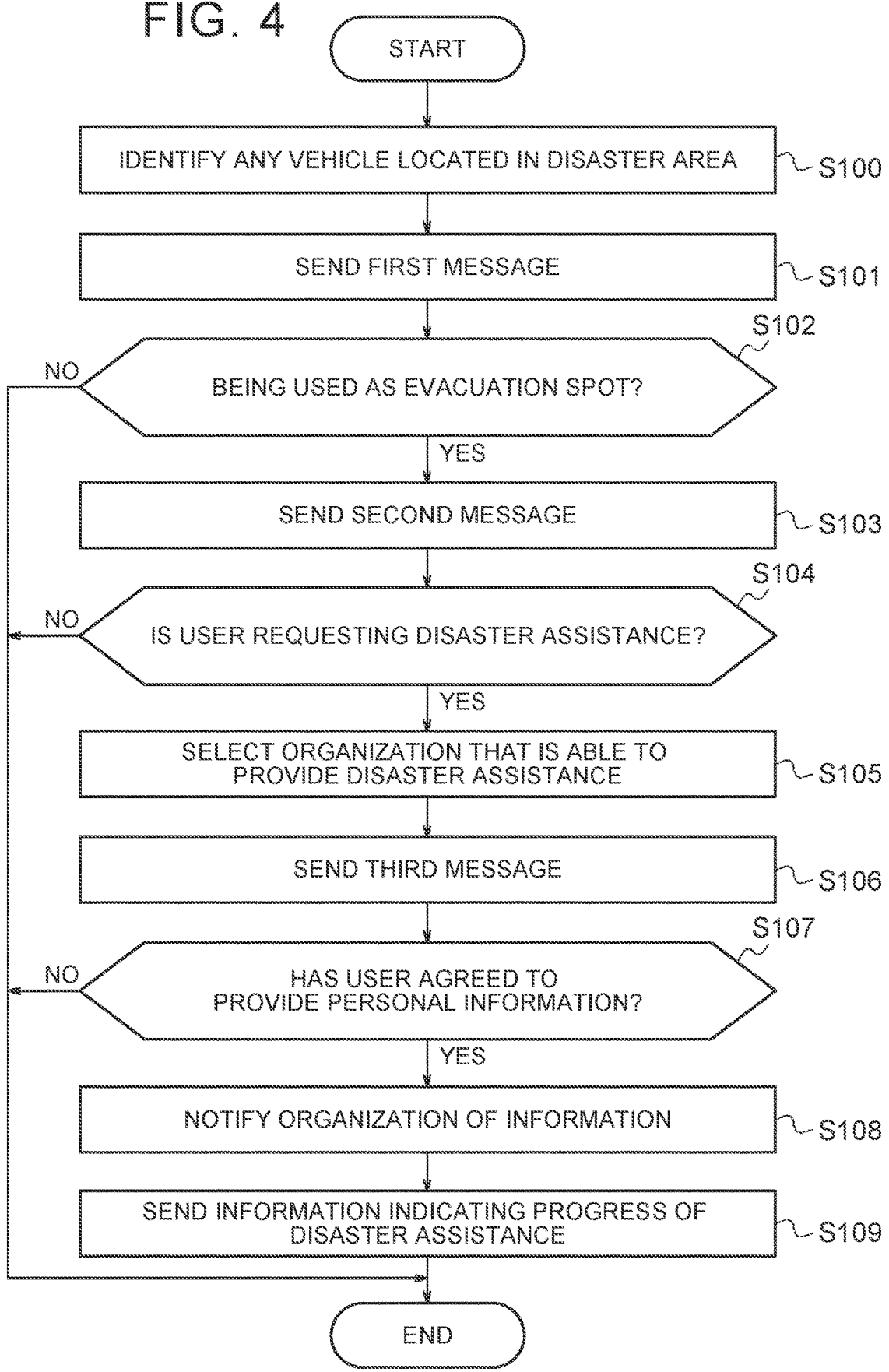

METHOD, INFORMATION PROCESSING DEVICE, AND NON-TRANSITORY STORAGE MEDIUM

CROSS-REFERENCE TO RELATED APPLICATION

This application claims priority to Japanese Patent Application No. 2020-210717 filed on Dec. 18, 2020, incorporated herein by reference in its entirety.

BACKGROUND

1. Technical Field

The present disclosure relates to methods, information processing devices, and non-transitory storage media.

2. Description of Related Art

A technique of providing assistance to a user of a vehicle in the event of a disaster is conventionally known in the art. For example, Japanese Unexamined Patent Application Publication No. 2015-018516 (JP 2015-018516 A) discloses that when a disaster occurs, safety confirmation information is sent to occupants of vehicles, and the occupants' safety is confirmed based on the responses from the occupants.

SUMMARY

There is room for improvement in technique of providing assistance to a user of a vehicle in the event of a disaster.

The present disclosure improves the technique of providing assistance to a user of a vehicle in the event of a disaster.

A method according to one embodiment of the present disclosure is a method that is performed by an information processing device that communicates with a plurality of vehicles. The method includes identifying any vehicle located in a disaster area out of the vehicles, sending a first message asking a user of the identified vehicle whether the vehicle is being used as an evacuation spot for spending a night, and determining whether the vehicle is being used as the evacuation spot, based on a first response to the first message.

The above method may further include sending a second message asking the user whether disaster assistance is necessary, and determining whether the user is requesting the disaster assistance, based on a second response to the second message.

In the above method, the second response may include information indicating content of the disaster assistance specified by the user.

The above method may further include sending a third message asking the user whether the user agrees to provide personal information of the user to a predetermined organization that provides the disaster assistance, and determining whether the user has agreed to provide the personal information of the user to the predetermined organization, based on a third response to the third message.

The method may further include selecting one organization that can provide the disaster assistance from a plurality of organizations, and the predetermined organization may be the selected one organization.

The method may further include notifying the predetermined organization of the personal information of the user and position information of the vehicle when the determinations are made that the vehicle is being used as the evacuation spot, that the user is requesting the disaster assistance, and that the user has agreed to provide the personal information of the user to the predetermined organization.

The method may further include sending information indicating a progress of the disaster assistance provided to the user by the predetermined organization.

An information processing device according to an embodiment of the present disclosure is an information processing device configured to communicate with a plurality of vehicles. The information processing device includes a control unit. The control unit is configured to identify any vehicle located in a disaster area out of the vehicles, send a first message asking a user of the identified vehicle whether the vehicle is being used as an evacuation spot for spending a night, and determine whether the vehicle is being used as the evacuation spot, based on a first response to the first message.

In the information processing device, the control unit may be configured to send a second message asking the user whether disaster assistance is necessary, and determine whether the user is requesting the disaster assistance, based on a second response to the second message.

In the above information processing device, the second response may include information indicating content of the disaster assistance specified by the user.

In the information processing device, the control unit may be configured to send a third message asking the user whether the user agrees to provide personal information of the user to a predetermined organization that provides the disaster assistance, and determine whether the user has agreed to provide the personal information of the user to the predetermined organization, based on a third response to the third message.

In the information processing device, the control unit may be configured to select one organization that is able to provide the disaster assistance from a plurality of organizations. The predetermined organization is the selected one organization.

In the information processing device, the control unit may be configured to notify the predetermined organization of the personal information of the user and position information of the vehicle when the determinations are made that the vehicle is being used as the evacuation spot, that the user is requesting the disaster assistance, and that the user has agreed to provide the personal information of the user to the predetermined organization.

In the information processing device, the control unit may be configured to send information indicating a progress of the disaster assistance provided to the user by the predetermined organization.

A non-transitory storage medium according to an embodiment of the present disclosure stores a program that causes one or more processors of a computer that communicates with a plurality of vehicles to identify any vehicle located in a disaster area out of the vehicles, send a first message asking a user of the identified vehicle whether the vehicle is being used as an evacuation spot for spending a night, and determine whether the vehicle is being used as the evacuation spot, based on a first response to the first message.

In the above non-transitory storage medium, the program may further cause the one or more processors of the computer to send a second message asking the user whether disaster assistance is necessary, and determine whether the user is requesting the disaster assistance, based on a second response to the second message.

In the above non-transitory storage medium, the program may further cause the one or more processors of the computer to send a third message asking the user whether the user agrees to provide personal information of the user to a predetermined organization that provides the disaster assistance, and determine whether the user has agreed to provide the personal information of the user to the predetermined organization, based on a third response to the third message.

In the non-transitory storage medium, the program may further cause the one or more processors of the computer to select one organization that can provide the disaster assistance from a plurality of organizations. The predetermined organization may be the one selected organization.

In the non-transitory storage medium, the program may further cause the one or more processors of the computer to notify the predetermined organization of the personal information of the user and position information of the vehicle when the determinations are made that the vehicle is being used as the evacuation spot, that the user is requesting the disaster assistance, and that the user has agreed to provide the personal information of the user to the predetermined organization.

In the non-transitory storage medium, the program may further cause the one or more processors of the computer to send information indicating a progress of the disaster assistance provided to the user by the predetermined organization.

According to one embodiment of the present disclosure, the technique of providing assistance to a user of a vehicle in the event of a disaster is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing an operation of the information processing device.

DETAILED DESCRIPTION OF EMBODIMENTS

Hereinafter, an embodiment of the present disclosure will be described.

Overview of Embodiment

Figure 1:
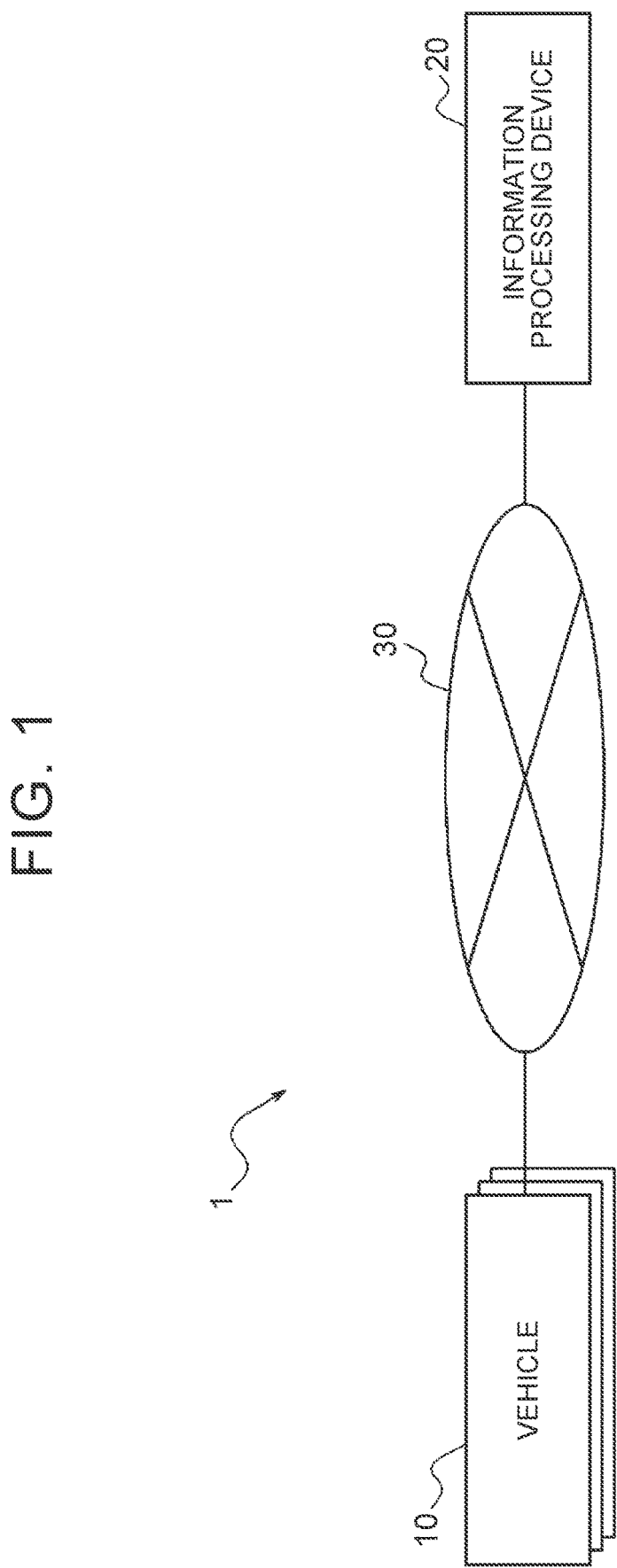
FIG. 1 is a block diagram showing a schematic configuration of a system according to an embodiment of the present disclosure.

The overview of a system 1 according to an embodiment of the present disclosure will be given with reference to FIG. 1. The system 1 includes a plurality of vehicles 10 and an information processing device 20. The vehicles 10 and the information processing device 20 can communicate with each other via a network 30. The network 30 includes, for example, the Internet and a mobile communication network. For example, the vehicles 10 are automobiles. However, the vehicles 10 are not limited to the automobiles, and may be any vehicles in which a human can ride. For example, the vehicles 10 may be able to be driven at Levels 1 to 5 of driving automation defined by the Society of Automotive Engineers (SAE). For example, the information processing device 20 is a server. However, the information processing device 20 is not limited to the server and may be any computer. The information processing device 20 can acquire, for example, position information from each vehicle 10 via the network 30.

First, the overview of the present embodiment will be described, and details of the present embodiment will be given later. The information processing device 20 identifies any vehicle 10 located in a disaster area out of the vehicles 10. The information processing device 20 sends a message asking the user of the identified vehicle 10 whether the vehicle 10 is being used as an evacuation spot for spending the night(s) (hereinafter this message is also referred to as the "first message"). The information processing device 20 then determines whether the vehicle 10 is being used as an evacuation spot, based on the response to the first message (hereinafter also referred to as the "first response").

The user who spends the night(s) in the vehicle 10 may experience inconveniences peculiar to spending nights in vehicles. Such inconveniences include, for example, but not limited to, developing economy class syndrome or being unable to protect privacy of the user spending the night(s) in the vehicle 10. According to the present embodiment, it is possible to determine whether the user is spending the night(s) in the vehicle 10 located in the disaster area. Accordingly, for example, the technique of providing assistance to the user of the vehicle 10 in the event of a disaster is improved in that suitable disaster assistance that deals with such inconveniences can be provided to the user spending the night(s) in the vehicle 10.

Next, each configuration of the system 1 will be described in detail.

Configuration of Vehicle

Figure 2:
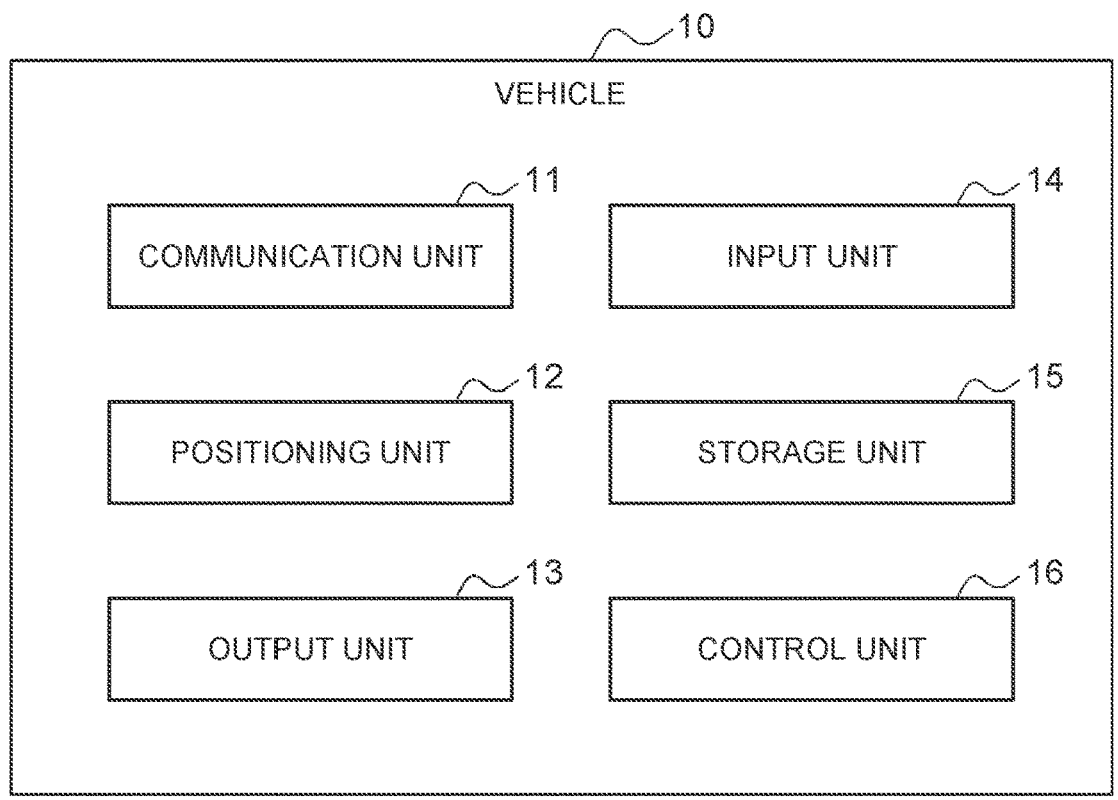
FIG. 2 is a block diagram showing a schematic configuration of a vehicle.

As shown in FIG. 2, the vehicle 10 includes a communication unit 11, a positioning unit 12, an output unit 13, an input unit 14, a storage unit 15, and a control unit 16.

The communication unit 11 includes one or more communication interfaces connected to the network 30. The communication interface is compatible with, for example, but not limited to, a mobile communication standard such as 4th generation (4G) or 5th generation (5G). In the present embodiment, the vehicle 10 communicates with the information processing device 20 via the communication unit 11 and the network 30.

The positioning unit 12 includes one or more devices that acquire position information of the vehicle 10. Specifically, the positioning unit 12 includes, for example, a receiver compatible with the Global Positioning System (GPS). However, the receiver is not limited to this, and the positioning unit 12 may include a receiver compatible with a desired satellite positioning system.

The output unit 13 includes one or more output devices that output information to notify the user. The output device is, for example, but is not limited to, a display that outputs information as images, a speaker that outputs information as audio, etc.

The input unit 14 includes one or more input devices that detect user input. The input device is, for example, but not limited to, a physical key, a capacitive key, a touch screen integrated with the display of the output unit 13, a microphone that receives voice input, or a camera.

The storage unit 15 includes one or more memories. The memory is, for example, but not limited to, a semiconductor memory, a magnetic memory, or an optical memory. Each memory included in the storage unit 15 may function as, for example, a main storage device, an auxiliary storage device, or a cache memory. The storage unit 15 stores any information to be used for operation of the vehicle 10. For example, the storage unit 15 may store a system program, an application program, and embedded software. The information stored in the storage unit 15 may be updatable with, for example, information acquired from the network 30 via the communication unit 11.

The control unit 16 includes one or more processors, one or more programmable circuits, one or more dedicated circuits, or a combination of these. The processor is, for example, but not limited to, a general-purpose processor such as central processing unit (CPU) or graphics processing unit (GPU), or a dedicated processor specialized for a specific process. The programmable circuit is, for example, but not limited to, a field-programmable gate array (FPGA). The dedicated circuit is, for example, but not limited to, an application specific integrated circuit (ASIC). The control unit 16 controls the overall operation of the vehicle 10.

Configuration of Information Processing Device

Figure 3:
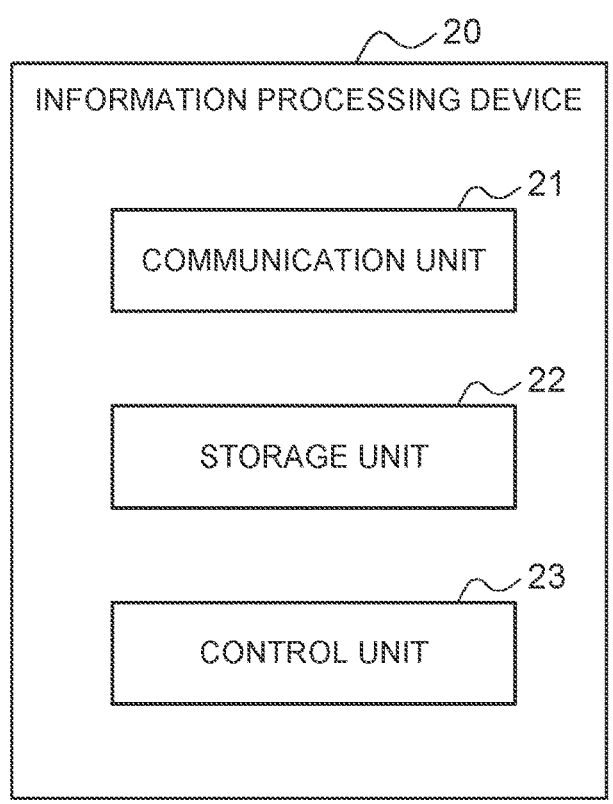
FIG. 3 is a block diagram showing a schematic configuration of an information processing device.

As shown in FIG. 3, the information processing device 20 includes a communication unit 21, a storage unit 22, and a control unit 23.

The communication unit 21 includes one or more communication interfaces connected to the network 30. The communication interface is compatible with, for example, a mobile communication standard, a wired local area network (LAN) standard, or a wireless LAN standard. However, the standard with which the communication interface is compatible is not limited to these, and the communication interface may be compatible with any communication standard. In the present embodiment, the information processing device 20 communicates with the vehicle 10 via the communication unit 21.

The storage unit 22 includes one or more memories. Each memory included in the storage unit 22 may function as, for example, a main storage device, an auxiliary storage device, or a cache memory. The storage unit 22 stores any information to be used for operation of the information processing device 20. For example, the storage unit 22 may store a system program, an application program, a database, and map information. The information stored in the storage unit 22 may be updatable with, for example, information acquired from the network 30 via the communication unit 21.

The control unit 23 includes one or more processors, one or more programmable circuits, one or more dedicated circuits, or a combination of these. The control unit 23 controls the overall operation of the information processing device 20.

Operation Flow of Information Processing Device

The operation of the information processing device 20 according to the present embodiment will be described with reference to FIG. 4.

Step S100: The control unit 23 of the information processing device 20 identifies any vehicle 10 located in a disaster area out of the vehicles 10.

Specifically, the control unit 23 receives information indicating a disaster area from a device such as an external server via the communication unit 21 and the network 30. The control unit 23 receives position information from each of the vehicles 10 via the communication unit 21 and the network 30. The control unit 23 then identifies any vehicle 10 located in the disaster area. For simplicity, it is herein assumed that one vehicle 10 has been identified. When two or more vehicles 10 have been identified, steps S101 to S109, which will be described later, may be performed for each of the identified vehicles 10.

Step S101: The control unit 23 sends a first message asking the user of the vehicle 10 identified in step S100 whether the vehicle 10 is being used as an evacuation spot for spending the night(s) (hereinafter also simply referred to as the "evacuation spot").

The control unit 23 may send the first message to the vehicle 10. In this case, the vehicle 10 outputs the first message as an image or voice via the output unit 13. Alternatively, the control unit 23 may send the first message to a terminal device used by the user of the vehicle 10. Specifically, the storage unit 22 of the information processing device 20 stores in advance, for each of the vehicles 10, information on the terminal device used by the user of the vehicle 10. The terminal device is, for example, a smartphone, a tablet terminal, or a personal computer (PC). However, the terminal device is not limited to these, and may be any computer connected to the network 30 so that the computer can communicate with the network 30. The control unit 23 sends the first message to the terminal device used by the user of the vehicle 10 by using the information stored in the storage unit 22. In this case, the terminal device outputs the first message as an image or voice.

Step S102: The control unit 23 determines whether the vehicle 10 identified in step S100 is being used as an evacuation spot, based on the first response to the first message. When the control unit 23 determines that the vehicle 10 is being used as an evacuation spot (step S102, Yes), the routine proceeds to step S103. When the control unit 23 determines that the vehicle 10 is not being used as an evacuation spot (step S102, No), the routine ends.

Specifically, the vehicle 10 or the terminal device acquires the first response input by the user. The control unit 23 receives information including the first response from the vehicle 10 or the terminal device via the communication unit 21 and the network 30. When the first response indicates that the user's answer to the question of the first message is yes (that is, when the first response indicates that the vehicle 10 is being used as an evacuation spot), the control unit 23 determines that the vehicle 10 is being used as an evacuation spot. When the first response indicates that the user's answer to the question of the first message is no (that is, when the first response indicates that the vehicle 10 is not being used as an evacuation spot), the control unit 23 determines that the vehicle 10 is not being used as an evacuation spot.

In the present embodiment, the user may input the response to the message by selecting one of a plurality of options included in the message. Alternatively, the response to the message may be input in a natural language. The content of the response input in a natural language can be identified by any natural language processing.

Step S103: When the control unit 23 determines in step S102 that the vehicle 10 is being used as an evacuation spot (step S102, Yes), the control unit 23 sends a message asking the user whether disaster assistance is necessary (hereinafter this message is also referred to as the "second message").

Specifically, the control unit 23 sends the second message to the vehicle 10 or the terminal device. The vehicle 10 or the terminal device outputs the second message as an image or voice.

Step S104: The control unit 23 determines whether the user is requesting disaster assistance, based on the response to the second message (hereinafter also referred to as the "second response"). When the control unit 23 determines that the user is requesting disaster assistance (step S104, Yes), the routine proceeds to step S105. When the control unit 23 determines that the user is not requesting disaster assistance (step S104, No), the routine ends.

Specifically, the vehicle 10 or the terminal device acquires the second response input by the user. The control unit 23 receives information including the second response from the vehicle 10 or the terminal device via the communication unit 21 and the network 30. When the second response indicates that the user's answer to the question of the second message is yes (that is, when the second response indicates that the user is requesting disaster assistance), the control unit 23 determines that the user is requesting disaster assistance. When the second response indicates that the user's answer to the question of the second message is no (that is, when the second response indicates that the user is not requesting disaster assistance), the control unit 23 determines that the user is not requesting disaster assistance.

When the second response indicates that the user is requesting disaster assistance, the second response may include information showing details of the disaster assistance. The content of the disaster assistance is, for example, provision of cots that can be used inside the vehicle 10 or provision of vehicle curtains that prevent the user from being seen from the outside of the vehicle 10. However, the content of the disaster assistance is not limited to these, and may be provision of relief supplies.

Step S105: When the control unit 23 determines in step S104 that the user is requesting disaster assistance (step S104, Yes), the control unit 23 selects one organization that is able to provide the disaster assistance from a plurality of organizations.

Specifically, the control unit 23 may ask a plurality of organizations including, for example, local governments, volunteer organizations, and companies whether they are able to provide the disaster assistance. In this case, the control unit 23 selects one organization that is able to provide the disaster assistance from the organizations based on the responses from the organizations. Alternatively, the storage unit 22 may store in advance, for each of the organizations, information indicating whether the organization is able to provide the disaster assistance. In this case, the control unit 23 selects one organization that is able to provide the disaster assistance from the organizations based on the information stored in the storage unit 22. The information stored in the storage unit 22 may be updated as necessary, for example, as time passes.

For example, it is herein assumed that the organizations include a first organization that is able to provide the disaster assistance and a second organization that is not able to provide the disaster assistance. In this case, the control unit 23 may select the first organization as one organization that is able to provide the disaster assistance. For example, it is also assumed that the organizations include a third organization that is able to provide cots and a fourth organization that is able to provide vehicle curtains. In this case, for example, when the content of the disaster assistance requested by the user in step S104 is "provision of cots," the control unit 23 may select the third organization as one organization that is able to provide the disaster assistance.

Step S106: The control unit 23 sends a message asking the user whether he or she agrees to provide his or her personal information to a predetermined organization that provides the disaster assistance (in this example, the organization selected in step S105) (hereinafter this message is also referred to as the "third message").

Specifically, the control unit 23 sends the third message to the vehicle 10 or the terminal device. The vehicle 10 or the terminal device outputs the third message as an image or voice.

Step S107: The control unit 23 determines whether the user has agreed to provide his or her personal information to the predetermined organization, based on the response to the third message (hereinafter, also referred to as the "third response"). When the control unit 23 determines that the user has agreed to provide his or her personal information to the predetermined organization (step S107, Yes), the routine proceeds to step S108. When the control unit 23 determines that the user has refused to provide his or her personal information to the predetermined organization (step S107, No), the routine ends.

Specifically, the vehicle 10 or the terminal device acquires the third response input by the user. The control unit 23 receives information including the third response from the vehicle 10 or the terminal device via the communication unit 21 and the network 30. When the third response indicates that the user's answer to the question of the third message is yes (that is, when the third response indicates that the user has agreed to provide his or her personal information to the predetermined organization), the control unit 23 determines that the user has agreed to provide his or her personal information to the predetermined organization. When the third response indicates that the user's answer to the question of the third message is no (that is, when the third response indicates that the user has refused to provide his or her personal information to the predetermined organization), the control unit 23 determines that the user has refused to provide his or her personal information to the predetermined organization. The personal information includes, for example, but not limited to, the name and gender of the user and identification information of the vehicle 10 (e.g., license plate number).

Step S108: When the control unit 23 determines in step S107 that the user has agreed to provide his or her personal information to the predetermined organization (step S107, Yes), the control unit 23 notifies the predetermined organization of the personal information of the user and the position information of the vehicle 10.

Specifically, the control unit 23 sends the personal information of the user and the position information of the vehicle 10 to a computer used by the predetermined organization via the communication unit 21 and the network 30. The predetermined organization is ready to provide the disaster assistance to the user when notified of the personal information of the user and the position information of the vehicle 10.

Step S109: The control unit 23 sends information indicating the progress of the disaster assistance provided to the user by the predetermined organization.

Specifically, the control unit 23 receives information indicating the progress of the disaster assistance from the computer used by the predetermined organization via the communication unit 21 and the network 30. The control unit 23 sends the received information to the vehicle 10 or the terminal device. Then, the vehicle 10 or the terminal device outputs the information indicating the progress of the disaster assistance as an image or voice. The progress of the disaster assistance may include, for example, but not limited to, the remaining time until the relief supplies are delivered to the vehicle 10.

Transmission of the information indicating the progress may be either pull type transmission that is performed in response to a request from the user or push type transmission that is performed without a request from the user. Transmission of the information indicating the progress may be repeatedly performed.

As described above, the information processing device 20 according to the present embodiment identifies any vehicle 10 located in the disaster area out of the vehicles 10. The information processing device 20 sends the first message asking the user of the identified vehicle 10 whether the vehicle 10 is being used as an evacuation spot for spending the night(s). The information processing device 20 determines whether the vehicle 10 is being used as an evacuation spot, based on the first response to the first message.

According to this configuration, it is possible to determine whether the user is spending the night(s) in the vehicle 10 located in the disaster area. Accordingly, for example, the technique of providing assistance to the user of the vehicle 10 in the event of a disaster is improved in that suitable disaster assistance that deals with the inconveniences peculiar to spending nights in vehicles can be provided to the user who is spending the night(s) in the vehicle 10.

Although the present disclosure is described above based on the drawings and the embodiment, it should be noted that those skilled in the art could make various modifications and alterations thereto based on the present disclosure. It should therefore be understood that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, in the above embodiment, the configuration and operation of the information processing device 20 may be distributed to a plurality of computers capable of communicating with each other.

In the example described in the above embodiment, the information processing device 20 first sends the first message, then sends the second message according to the first response to the first message, and sends the third message according to the second response to the second message. However, the information processing device 20 may send the first message, the second message, and the third message at a time.

For example, an embodiment is also possible in which a general-purpose computer functions as the information processing device 20 according to the above embodiment. Specifically, a program describing the content of processing for implementing the functions of the information processing device 20 according to the above embodiment is stored in a memory of a general-purpose computer, and the program is read and executed by one or more processors of the computer. Accordingly, the present embodiment can be implemented as a non-transitory storage medium storing a program.

What is claimed is:

1. An information processing device configured to communicate with a plurality of vehicles, the information processing device comprising a processor, wherein the processor is configured to:
    identify any vehicle located in a disaster area out of the plurality of vehicles;
    send a first message asking an occupant of the identified vehicle whether the vehicle is being used as an evacuation spot for spending a night; and
    determine that the vehicle is being used as the evacuation spot in a case where the occupant answers yes as a first response to the first message.

2. The information processing device according to claim 1, wherein the processor is configured to:
    send a second message asking the occupant whether disaster assistance is necessary; and
    determine that the occupant is requesting the disaster assistance in a case where the occupant answers yes as a second response to the second message.

3. The information processing device according to claim 2, wherein the second response further includes information indicating content of a request of the disaster assistance specified by the occupant.

4. The information processing device according to claim 3, wherein the content of the request of the disaster assistance includes a request of providing cots configured to be used inside the vehicle and a request of providing vehicle curtains configured to prevent the occupant from being seen from an outside of the vehicle.

5. The information processing device according to claim 2, wherein the processor is configured to:
    send a third message asking the occupant whether the occupant agrees to provide personal information of the occupant to a predetermined organization that provides the disaster assistance; and
    determine that the occupant has agreed to provide the personal information of the occupant to the predetermined organization in a case where the occupant has answered yes as a third response to the third message.

6. The information processing device according to claim 5, wherein the processor is configured to select one organization that is able to provide the disaster assistance from a plurality of organizations and the predetermined organization is the selected one organization.

7. The information processing device according to claim 5, wherein the processor is configured to notify the predetermined organization of the personal information of the occupant and position information of the vehicle in a case where the determinations are made that the vehicle is being used as the evacuation spot, that the occupant is requesting the disaster assistance, and that the occupant has agreed to provide the personal information of the occupant to the predetermined organization.

8. The information processing device according to claim 7, wherein the processor is configured to send information indicating a progress of the disaster assistance provided to the occupant by the predetermined organization.

9. The information processing device according to claim 8, wherein the progress of the disaster assistance includes remaining time until relief supplies are delivered to the vehicle.

* * * * *